(12) United States Patent
Cordery et al.

(10) Patent No.: US 7,724,403 B2
(45) Date of Patent: May 25, 2010

(54) METHOD OF REGISTERING A SCANNING GRID OF A SCANNER WITH A PRINTING GRID OF A PRINTER

(75) Inventors: Robert A. Cordery, Danbury, CT (US); Bertrand Haas, New Haven, CT (US); Hongmei Gou, College Park, MD (US)

(73) Assignee: Pitney Bowes Inc., Stamford, CT (US)

( * ) Notice: Subject to any disclaimer, the term of this patent is extended or adjusted under 35 U.S.C. 154(b) by 881 days.

(21) Appl. No.: 11/586,925

(22) Filed: Oct. 26, 2006

(65) Prior Publication Data
US 2008/0144129 A1    Jun. 19, 2008

(51) Int. Cl.
*H04N 1/04* (2006.01)
(52) U.S. Cl. ............... 358/474; 358/406; 358/504; 358/1.3
(58) Field of Classification Search ........... 358/474, 358/406, 504, 1.3, 1.13
See application file for complete search history.

(56) References Cited

U.S. PATENT DOCUMENTS

| 7,090,324 B2* | 8/2006 | Mizes ................. 347/19 |
| 7,095,531 B2* | 8/2006 | Mizes et al. .......... 358/1.9 |
| 7,515,305 B2* | 4/2009 | Mizes ................. 358/3.26 |

* cited by examiner

*Primary Examiner*—Houshang Safaipour
(74) *Attorney, Agent, or Firm*—Ronald Reichman; Angelo N. Chaclas

(57) ABSTRACT

A method of registering a scanning grid of a scanner with a printing grid of a printer that includes placing a predetermined motif in a digital image to create a modified image, printing the modified image using the printer to create a printed modified image, scanning the printed modified image using the scanner to create a scanned modified image that includes the motif, using the motif included in the scanned modified image to determine a rotation α of the scanning grid of the scanner with respect to the printing grid of the printer, and using the motif included in the scanned modified image to determine a translation vector that gives a position of a node of the printing grid in a coordinate system of the scanning grid.

13 Claims, 4 Drawing Sheets

METHOD OF REGISTERING A SCANNING GRID OF A SCANNER WITH A PRINTING GRID OF A PRINTER

FIELD OF THE INVENTION

The present invention relates to the printing and subsequent scanning of digital images, and in particular to a method of registering a scanning grid of a scanner having a given scan resolution with a printing grid of a printer having a given print resolution.

BACKGROUND OF THE INVENTION

A number of applications exist in which an initial digital image is printed with a printer at a given resolution and scanned with a scanner at a slightly finer resolution and in a position that might be slightly rotated. For example, postal indicia typically begin as digital images that are printed onto a mailpiece by, for example, a mailer and that are later scanned with a scanner by, for example, a postal service such as the USPS. In addition, with the enactment of The Check Clearing for the $21^{st}$ Century Act, which removed the legal requirement that an original paper check had to be presented to obtain payment, checks are more frequently being generated as digital images that are printed and then subsequently scanned and deposited as scanned images. In these and other similar circumstances, it would be beneficial to be able to register the scanning grid of the scanner used to scan the printed image with the printing grid of the printer used to print the original digital image, as such registration would facilitate the reconstruction of the original digital image from the scanned image. Reconstruction of the original digital image in this manner would greatly assist with a number of applications, including, without limitation, forensic analysis, copy and fraud detection, and increasing the readable density of printed information, among other things. Thus, there is a need for a method of registering a scanning grid of a scanner with a printing grid of a printer.

SUMMARY OF THE INVENTION

The invention provides a method of registering a scanning grid of a scanner with a printing grid of a printer that includes placing a predetermined motif in a digital image to create a modified image, printing the modified image using the printer to create a printed modified image, scanning the printed modified image using the scanner to create a scanned modified image that includes the motif, using the motif included in the scanned modified image to determine a rotation $\alpha$ of the scanning grid of the scanner with respect to the printing grid of the printer, and using the motif included in the scanned modified image to determine a translation vector that gives a position of a node of the printing grid in a coordinate system of the scanning grid.

In one embodiment, the motif includes at least one elongated line that at least partially covers a first row of pixels and a second row of pixels of the scanning grid when the scanned modified image is created. In this embodiment, the step of using the motif to determine a rotation $\alpha$ includes generating a first greyness curve for the first row and a second greyness curve for the second row, measuring a distance D equal to the number of pixels between a first pixel in the first row having a pre-selected greyness value and a second pixel in the second row having said pre-selected greyness value, calculating an angle according to the following formula: $\pi/2 - \arctan(D/d)$, wherein d is the number of pixels separating the first row and the second row, and determining the rotation $\alpha$ based on the angle. The rotation $\alpha$ may be determined to be equal to the angle, or, alternatively, the step of determining the rotation $\alpha$ based on the angle may include calculating an average of the angle and one or more additional angles, each of the one or more additional angles being determined using a respective additional row of pixels covering partially the same elongated line or another parallel such line included in the motif and using respective additional steps similar to the generating, measuring and calculating steps described above.

In another embodiment, the motif includes a first series of substantially parallel first line segments and a second series of substantially parallel second line segments, wherein the line segments of the first series are substantially perpendicular to the line segments of the second series. In this embodiment, the first line segments partially cover a plurality of rows of first pixels of the scanning grid when the scanned modified image is created, and the second line segments partially cover a plurality of columns of second pixels of the scanning grid when the scanned modified image is created. The step of using the motif included in the scanned modified image to determine a translation vector in this embodiment includes the following steps: (a) for each of a plurality of selected ones of said partially covered rows: plotting a grey level of each of the first pixels in the selected one of the partially covered rows, fitting a first curve to the plotted grey levels of each of the first pixels, plotting a first ideal grey level curve for the selected one of the partially covered rows that represents a plurality of grey levels that would have resulted had the scanning grid and the printing grid been aligned with one another, and measuring a first offset between said first curve and said first ideal grey level curve; (b) plotting each first offset measured in step (a) and obtaining a first offset function therefrom; (c) for each of a plurality of selected ones of the partially covered columns: plotting a grey level of each of the second pixels in the selected one of the partially covered columns, fitting a second curve to the plotted grey levels of each of the second pixels, plotting a second ideal grey level curve for the selected one of the partially covered columns that represents a plurality of grey levels that would have resulted had the scanning grid and said printing grid been aligned with one another, and measuring a second offset between the second curve and the second ideal grey level curve; and (d) plotting each second offset measured in step (c) and obtaining a second offset function therefrom; wherein the translation vector comprises the first offset function and second offset function.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
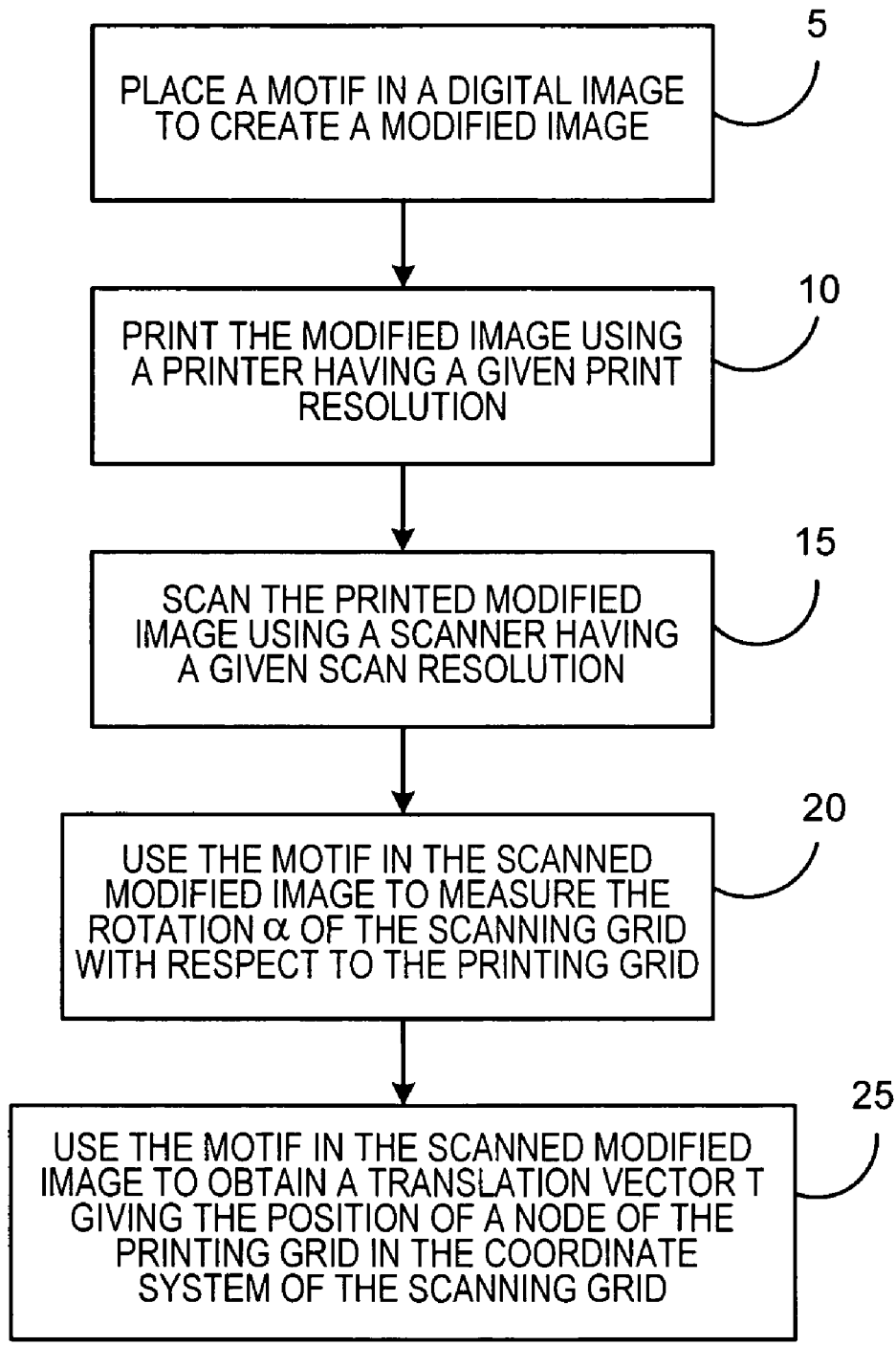
FIG. 1 is a flowchart of a method of registering a scanning grid of a scanner having a given scan resolution with a printing grid of a printer having a given print resolution according to an embodiment of the present invention.

FIG. 1 is a flowchart of a method of registering a scanning grid of a scanner having a given scan resolution with a printing grid of a printer having a given print resolution according to an embodiment of the present invention. As is known, the scanning grid and the printing grid each typically comprise an array of square elements, with each element being a single pixel. Preferably, the resolution of the scanner is finer than the resolution of the printer. The method begins at step 5, wherein a predetermined pattern, referred to herein as a motif, is electronically placed in a digital image to create a modified image. Next, at step 10, the modified image is printed using the printer described above. At step 15, the printed modified image (which includes the original digital image and the motif added thereto) is then scanned using the scanner described above to create a scanned modified image. As will be appreciated, the scanned modified image will include both the original digital image and the added motif. Next, at step 20, the motif in the scanned modified image is used to measure the rotation α of the scanning grid of the scanner used to create the scanned image in step 15 with respect to the printing grid of the printer that printed the printed modified image in step 10. Finally, in step 25, the motif in the scanned modified image is used to obtain a translation vector T which gives the position of a node on the printing grid in the coordinate system of the scanning grid. The translation vector T will provide an offset value in both the X and Y directions, and thus preferably includes an X offset function and a Y offset function. Thus, the angle of rotation α and the translation vector T together serve to register the scanning grid with the printing grid.

Figure 2:
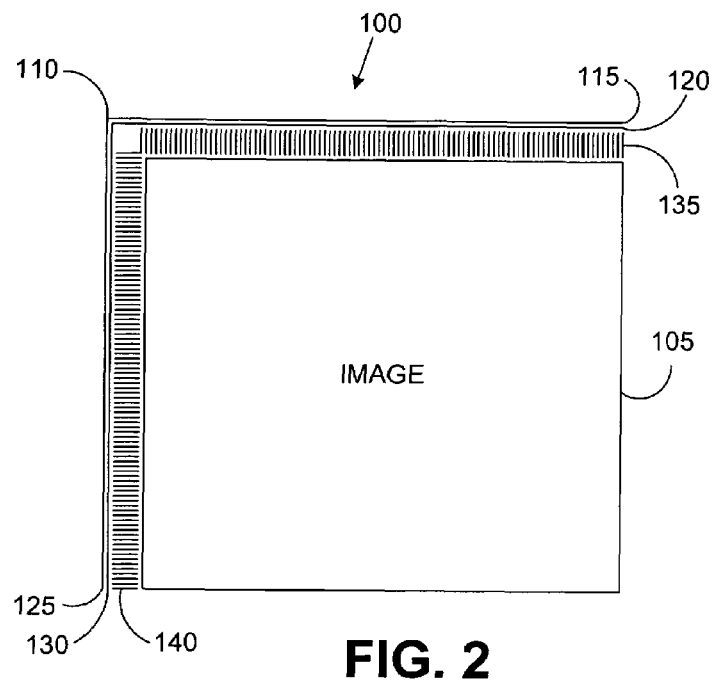
FIG. 2 is a schematic representation of a modified image that may be used in a preferred implementation of the method shown in FIG. 1.

FIG. 2 is a schematic representation of a modified image 100 that may be used in a preferred implementation of the method shown in FIG. 1. As seen in FIG. 2, the modified image 100 includes an original image portion 105 and a preferred motif 110 provided along at least a portion of the left and upper edges of the original image portion 105. The motif 110 includes first and second elongated horizontal lines 115 and 120 (parallel to one another) along the upper edge of the original image portion 105 and first and second elongated vertical lines 125 and 130 (parallel to one another) along the left edge of the original image portion 105. In addition, the motif 110 further includes a series of short vertical line segments (parallel to one another) 135 along the upper edge of the original image portion 105 and a series of short horizontal line segments (parallel to one another) 140 along the left edge of the original image portion 105.

Figure 3:
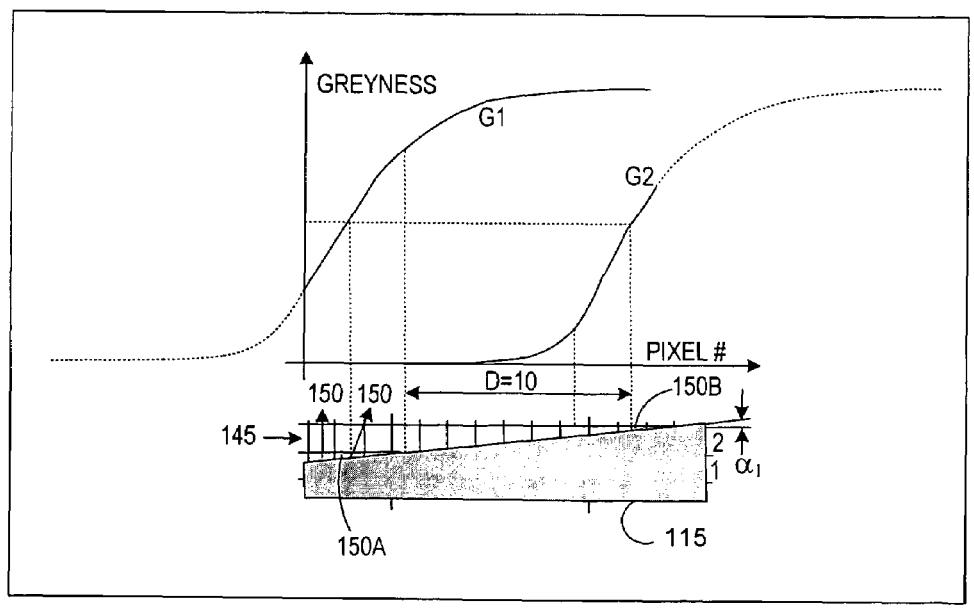
FIG. 3 is a schematic representation of a portion of the scanning grid and a portion of the modified image and the greyness graph that may be used to implement a portion of an embodiment of the method of FIG. 1.

According to one particular embodiment of the invention, the first and second elongated horizontal lines 115 and 120 and the first and second elongated vertical lines 125 and 130 may be used to perform step 20 of the method shown in FIG. 1, i.e., to measure the rotation α of the scanning grid relative to the printing grid when the modified image 100 is printed and scanned as in steps 10 and 15 shown in FIG. 1. FIG. 3 shows a portion of the scanning grid 145 including a plurality of pixels 150. The portion of the scanning grid 145 shown in FIG. 3 includes certain of the pixels 150 from a row 1 and a row 2 of the scanning grid 145. FIG. 3 also shows a portion of the elongated horizontal line 115 of the motif 110 as scanned by the scanner (step 15 in FIG. 1). As seen in FIG. 3, the elongated horizontal line 115 is positioned at an angle $\alpha_1$ with respect to the longitudinal axis of the rows 1 and 2 of the scanning grid 145. As explained herein, that angle $\alpha_1$ may be used to determine the rotation α of the scanning grid with respect to the printing grid (step 20 shown in FIG. 1).

According to an aspect of the invention, the angle $\alpha_1$ may be determined in the following manner. First, a greyness curve for row 1 and row 2 (G1 and G2, respectively) is calculated and plotted as shown in FIG. 3. In each case, the greyness curve is a plot of the measured greyness (from the scanned image) on the Y-axis versus the pixels in the respective row on the X-axis. In other words, the greyness curve provides a greyness value (Y-axis) ranging from 0 to 1 for each pixel 150 (X-axis) in the row of the scanning grid in question. In the preferred embodiment, the greyness value for each pixel is determined by the following formula: greyness=1−(the grey level of the scanned pixel in question), wherein the grey levels for each pixel have been converted from a 0 to 255 scale to a 0 to 1 scale (by dividing each grey scale value by 255), and wherein a grey scale value of 0 is black and a grey scale value of 1 is white. The next step in determining the angle $\alpha_1$ involves measuring a horizontal distance D that is equal to the number of pixels between a first pixel in row 1 (e.g., pixel 150A in FIG. 3) having a preselected greyness value (e.g., 0.5) and a second pixel in row 2 (e.g., pixel 150B in FIG. 3) having the same pre-selected greyness value (e.g., 0.5). The angle $\alpha_1$ may then be determined according to the following formula: $\alpha_1 = \pi/2 - \arctan(D)$. In addition, the rows 1 and 2 need not be directly adjacent to one another (as shown in FIG. 3), but instead may be separated from one another by a number of pixels equal to d. In such a case, the formula that is used is as follows: $\alpha_1 = \pi/2 - \arctan(D/d)$. In the preferred embodiment, this process is repeated for the elongated horizontal line 120 to obtain an angle $\alpha_2$ and for the elongated vertical lines 125 and 130 (in which case rows of pixels are switched for columns of pixels in the processing) to obtain angles $\alpha_3$ and $\alpha_4$. The angles $\alpha_1$, $\alpha_2$, $\alpha_3$, and $\alpha_4$ may then be averaged to obtain the rotation α of the scanning grid with respect to the printing grid. Alternatively, any one of the angles $\alpha_1$, $\alpha_2$, $\alpha_3$, or $\alpha_4$ may be measured alone and used for the rotation α of the scanning grid with respect to the printing grid. As a further alternative, any sub-combination of two or more of the angles $\alpha_1$, $\alpha_2$, $\alpha_3$, and $\alpha_4$ may be measured and averaged to obtain the rotation α of the scanning grid with respect to the printing grid.

Figure 4:
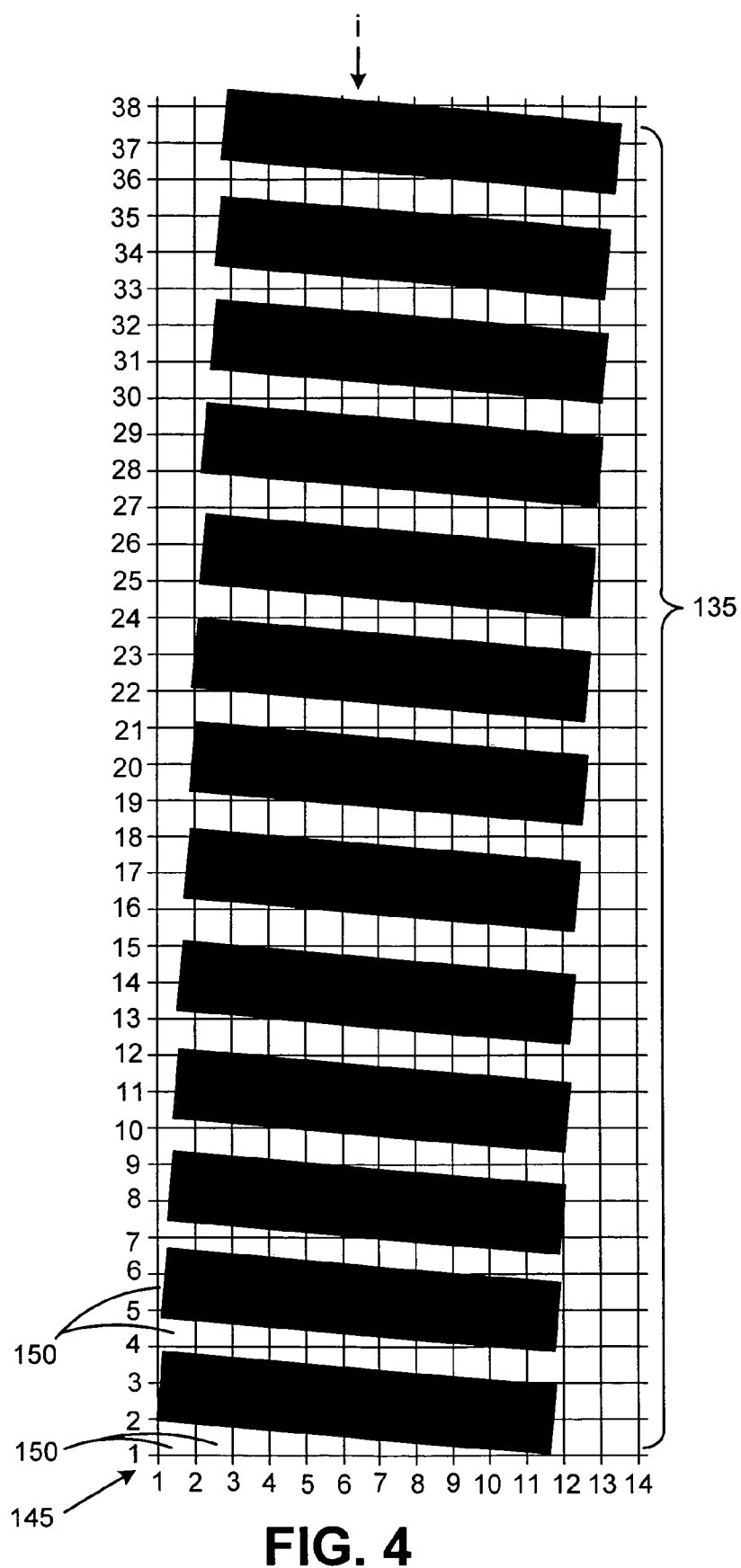
FIG. 4 is a schematic representation of a different portion of the scanning grid and a different portion of the modified image that may be used to implement a different portion of an embodiment of the method of FIG. 1.

According to another particular embodiment of the invention, the short vertical line segments 135 and the short horizontal line segments 140 of the motif 110 may be used to perform step 25 of the method shown in FIG. 1, i.e., to determine the translation vector T which gives the position of a node on the printing grid in the coordinate system of the scanning grid. FIG. 4 shows a portion of the scanning grid 145 including a plurality of pixels 150. The portion of the scanning grid 145 shown in FIG. 4 includes certain of the pixels 150 from rows 1 through 14 and from columns 1 through 38 of the scanning grid 145. FIG. 4 also shows a number of the short vertical line segments 135 of the motif 110 as scanned by the scanner (step 15 in FIG. 1).

Figure 5:
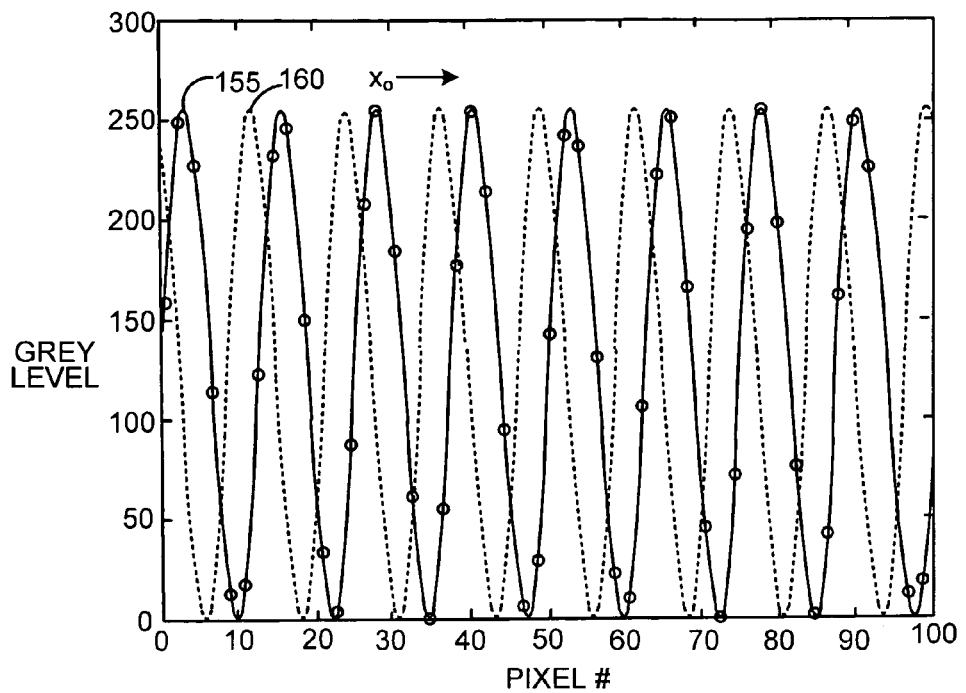
FIG. 5 shows a plot of grey levels versus pixels that may be utilized in a portion of an embodiment of the method of FIG. 1.
Figure 6:
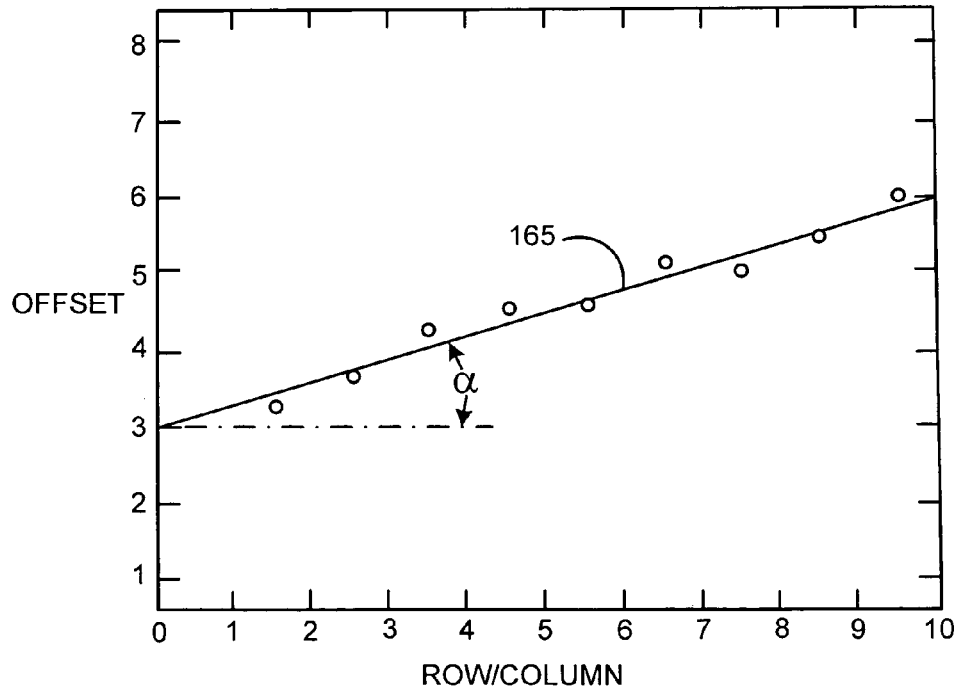
FIG. 6 shows a plot of offset values and an offset function determined according to a portion of an embodiment of the method of FIG. 1.

According to one particular embodiment of the invention, the translation vector T may be determined as follows. First, a row i of pixels 150 is selected. As seen in FIG. 4, row i is the sixth row of pixels. Then, as seen in FIG. 5, the grey level for each pixel 150 in the selected row i is plotted and a curve 155 is fit thereto. Next, an ideal curve 160 is plotted adjacent to the curve 155 which represents that grey level curve that would have resulted for the selected row i had the printing grid and the scanning grid been perfectly aligned with one another. As will be appreciated by those of skill in the art, this ideal curve may be determined from the print model for the printing of the printed modified image (step 10 in FIG. 1) and the known width of and separation between each of the short vertical line segments 135. From the curve 155 and the ideal curve 160, an X-direction offset for the selected row i may be determined (shown as $X_O$ in FIG. 5). This process may then be repeated for a number of different selected rows, and each measured offset may be plotted as shown in FIG. 6. A best fit (least square) X-direction offset function 165 may then be determined based on the plotted offset values. Moreover, the steps just described may then be repeated using the short horizontal line segments 140 (with selected columns being substituted for selected rows) to obtain a best fit (least square) Y-direction offset function 165. The X-direction and Y-direction offset functions 165 may then be used to determine an X-direction offset and a Y-direction offset for a given node in the printing grid. In other words, given a node in the printing grid identified by a particular row and column, the appropriate X-direction and Y-direction offsets to be used to determine the position of that node in the scanning grid may be determined from the X-direction and Y-direction offset functions 165. In addition, the rotation α of the scanning grid with respect to the printing grid may also be determined by measuring the angle of either the X-direction offset function 165 or the Y-direction offset function 165 with respect to the X (horizontal) axis in the function as shown in FIG. 6. In one particular embodiment, the rotation α of the scanning grid with respect to the printing grid may be determined by measuring the angle of both the X-direction offset function 165 and the Y-direction offset function 165 with respect to the X (horizontal) axis in the function and then averaging the two measured angles.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of registering a scanning grid of a scanner with a printing grid of a printer, comprising:
   placing a predetermined motif in a digital image to create a modified image;
   printing the modified image using said printer to create a printed modified image;
   scanning the printed modified image using said scanner to create a scanned modified image, said scanned modified image including said motif;
   using the motif included in said scanned modified image to determine a rotation α of said scanning grid of said scanner with respect to said printing grid of said printer; and
   using the motif included in said scanned modified image to determine a translation vector, said translation vector giving a position of a node of said printing grid in a coordinate system of said scanning grid.

2. The method according to claim 1, wherein said motif includes at least one elongated line.

3. The method according to claim 2, wherein said at least one elongated line at least partially covers a first row of pixels and a second row of pixels of said scanning grid when said scanned modified image is created, and wherein said step of using the motif included in said scanned modified image to determine a rotation α comprises:
   generating a first greyness curve for said first row and a second greyness curve for said second row;
   measuring a directional distance D, said directional distance D being equal to the number of pixels between a first pixel in said first row having a pre-selected greyness value from said first greyness curve and a second pixel in said second row having said pre-selected greyness value from said second greyness curve;
   calculating an angle according to the following formula: $\pi/2 - \arctan(D/d)$, wherein d is the number of pixels separating said first row and said second row; and
   determining said rotation α based on said angle.

4. The method according to claim 3, wherein said rotation α is determined to be equal to said angle.

5. The method according to claim 3, wherein said step of determining said rotation α based on said angle comprises calculating an average of said angle and one or more additional angles, each of said one or more additional angles being determined using a respective additional elongated line included in said motif and using respective additional steps similar to said generating, measuring and calculating steps.

6. The method according to claim 1, wherein said motif includes at least one elongated line, a first series of substantially parallel first line segments and a second series of substantially parallel second line segments, said first line segments being substantially perpendicular to said second line segments.

7. The method according to claim 6, wherein said step of using the motif included in said scanned modified image to determine a rotation α uses said at least one elongated line and wherein said step of using the motif included in said scanned modified image to determine a translation vector uses said first line segments and said second line segments.

8. The method according to claim 1, wherein said motif includes a first series of substantially parallel first line segments and a second series of substantially parallel second line segments, said first line segments being substantially perpendicular to said second line segments.

9. The method according to claim 8, wherein said scanning grid and said printing grid are not aligned with one another, wherein said first line segments partially cover a plurality of rows of first pixels of said scanning grid when said scanned modified image is created, and wherein said second line segments partially cover a plurality of columns of second pixels of said scanning grid when said scanned modified image is created, said first pixels being different from said second pixels, and wherein said step of using the motif included in said scanned modified image to determine a translation vector comprises:

(a) for each of a plurality of selected ones of said partially covered rows:
  plotting a grey level of each of the first pixels in the selected one of said partially covered rows;
  fitting a first curve to said plotted grey levels of each of the first pixels;
  plotting a first ideal grey level curve for said selected one of said partially covered rows that represents a plurality of grey levels that would have resulted had said scanning grid and said printing grid been aligned with one another; and
  measuring a first offset between said first curve and said first ideal grey level curve;
(b) plotting each said first offset measured in step (a) and obtaining a first offset function therefrom;
(c) for each of a plurality of selected ones of said partially covered columns:
  plotting a grey level of each of the second pixels in the selected one of said partially covered columns;
  fitting a second curve to said plotted grey levels of each of the second pixels;
  plotting a second ideal grey level curve for said selected one of said partially covered columns that represents a plurality of grey levels that would have resulted had said scanning grid and said printing grid been aligned with one another; and
  measuring a second offset between said second curve and said second ideal grey level curve;
(d) plotting each said second offset measured in step (c) and obtaining a second offset function therefrom;
wherein said translation vector comprises said first offset function and second offset function.

10. The method according to claim 9, wherein said step of using the motif to determine said rotation $\alpha$ comprises determining one or both of a first angle of said first offset function with respect to a first function axis and a second angle of said second offset function with respect to a second function axis and determining said rotation $\alpha$ from one or both of said first angle and said second angle.

11. The method according to claim 10, wherein said rotation $\alpha$ is determined to be equal to said first angle.

12. The method according to claim 10, wherein said rotation $\alpha$ is determined to be equal to said second angle.

13. The method according to claim 10, wherein said rotation $\alpha$ is determined to be equal to an average of said first angle and said second angle.

* * * * *